United States Patent
Cake (10) Patent No.: US 8,799,946 B2
(45) Date of Patent: Aug. 5, 2014

(54) APPARATUS AND METHOD FOR PROVIDING PROGRAM GUIDE WITH CHANNEL SIGNAL STRENGTH

(75) Inventor: Dennis Lee Cake, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 434 days.

(21) Appl. No.: 12/085,736

(22) PCT Filed: Nov. 6, 2006

(86) PCT No.: PCT/US2006/043175
§ 371 (c)(1),
(2), (4) Date: May 29, 2008

(87) PCT Pub. No.: WO2007/064445
PCT Pub. Date: Jun. 7, 2007

(65) Prior Publication Data
US 2009/0100467 A1    Apr. 16, 2009

Related U.S. Application Data

(60) Provisional application No. 60/741,226, filed on Dec. 1, 2005.

(51) Int. Cl.
*H04N 5/445* (2011.01)
*H04N 5/50* (2006.01)

(52) U.S. Cl.
USPC ............... 725/39; 725/37; 725/40; 348/569; 348/570

(58) Field of Classification Search
CPC ............ H04N 21/431; H04N 21/4312; H04N 21/482; H04N 21/4821; H04N 21/4826
USPC ..................... 348/567, 570, 56, 9
See application file for complete search history.

(56) References Cited

U.S. PATENT DOCUMENTS

| | | | |
|---|---|---|---|
| 5,371,550 A | 12/1994 | Shibutani et al. | |
| 6,169,543 B1 | 1/2001 | Wehmeyer | |
| 6,763,522 B1 * | 7/2004 | Kondo et al. | 725/39 |
| 7,028,326 B1 | 4/2006 | Westlake et al. | |

(Continued)

FOREIGN PATENT DOCUMENTS

| | | |
|---|---|---|
| CN | 1314046 A | 9/2001 |
| JP | 06-077779 | 3/1994 |

(Continued)

OTHER PUBLICATIONS

International Search Report, dated Mar. 23, 2007.

(Continued)

*Primary Examiner* — Nasser Goodarzi
*Assistant Examiner* — Kyu Chae
(74) *Attorney, Agent, or Firm* — Robert D. Shedd; Reitseng Lin (57) ABSTRACT

An apparatus provides an on-screen program guide that includes information indicating channel signal strength. According to an exemplary embodiment, the apparatus includes a memory operative to store data related to the program guide, and a processor operative to enable display of the program guide using the stored data. The program guide includes a plurality of program titles. The processor determines a program title pointed to by a pointer and determines a channel associated with the determined program title. Signal strength of the determined channel is displayed along with the program guide.

30 Claims, 6 Drawing Sheets

(56) References Cited

U.S. PATENT DOCUMENTS

| | | | |
|---|---|---|---|
| 7,275,254 B1 * | 9/2007 | Jutzi | 725/72 |
| 7,489,948 B2 | 2/2009 | Taromaru et al. | |
| 2004/0105031 A1 * | 6/2004 | Shibusawa | 348/570 |
| 2004/0145680 A1 * | 7/2004 | Bennett | 348/570 |
| 2004/0183947 A1 * | 9/2004 | Lee | 348/570 |
| 2004/0244050 A1 * | 12/2004 | Kim | 725/124 |
| 2006/0230429 A1 * | 10/2006 | Van Horck | 725/135 |
| 2007/0054640 A1 * | 3/2007 | Wada et al. | 455/226.1 |
| 2009/0293089 A1 * | 11/2009 | Taylor et al. | 725/53 |

FOREIGN PATENT DOCUMENTS

| | | | | |
|---|---|---|---|---|
| JP | 8251122 | | 9/1996 | |
| JP | 2002-320165 | | 10/2002 | |
| JP | 2004-165860 | | 6/2004 | |
| JP | 2004-187118 | | 7/2004 | |
| JP | 2004-304372 | | 10/2004 | |
| JP | 2005-217849 | | 8/2005 | |
| KR | 20000045554 | | 7/2000 | |
| WO | 99/65242 | | 12/1999 | |
| WO | WO 00/78039 A1 * | 12/2000 | | H04N 5/445 |
| WO | 2005/015900 A1 | | 2/2005 | |

OTHER PUBLICATIONS

Malaysia International Search Report for Application PI 20081783 dated May 29, 2009.

* cited by examiner

APPARATUS AND METHOD FOR PROVIDING PROGRAM GUIDE WITH CHANNEL SIGNAL STRENGTH

CROSS REFERENCE TO RELATED APPLICATION

This application claims the benefit, under 35 U.S.C. §365 of International Application PCT/US2006/043175 filed Nov. 6, 2006, which was published in accordance with PCT Article 21(2) on Jun. 7, 2007 in English and claims priority of U.S. Provisional patent application No. 60/741,226 filed Dec. 1, 2005.

This application claims priority to and all benefits accruing from a provisional application filed in the United States Patent and Trademark Office on Dec. 1, 2005, and there assigned Ser. No. 60/741,226.

BACKGROUND OF THE INVENTION

1. Field of the Invention

The present invention generally relates to program guides used by apparatuses such as television signal receivers, and more particularly, to an apparatus and method for providing a program guide that includes information indicating channel signal strength.

2. Background Information

A program guide is an on-screen display feature that displays information analogous to program listings found in local newspapers or other print media. The information contained in a program guide may include programming characteristics such as channel number, program title, start time, end time, and a brief description of a program's content. Program guides may for example be arranged in a two-dimensional grid format with time information on one (e.g., horizontal) axis and channel information on the other (e.g., vertical) axis. Program guides may also be interactive in that they allow users to make channel selections directly from the program guide itself.

With current program guides, a user making a channel selection from the program guide does so without any information pertaining to the possibility of actually receiving that channel. If the channel does not appear following selection, the user may not know why. With a satellite receiver system, for example, a user seeking signal strength information must access a dedicated menu that provides the signal strength of all channels at one time. With this approach, information concerning the strength of a particular channel is not available to the user at the time s the channel is selected.

With an analog terrestrial broadcast system, inadequate channel signal strength may not pose a serious concern for users. For example, if a channel is not properly received after it is selected, the user may assume that the selected channel does not possess sufficient signal strength and simply select another channel. However, with digital broadcast systems, channel signal strength does become an important concern because the signal of a selected channel will be either off or on, depending on whether the strength of the received channel exceeds a threshold.

Accordingly, there is a need for an apparatus and method that addresses the foregoing problem, and thereby provides users with information pertaining to the possibility of actually receiving a channel at the time of channel selection. The present invention addresses these and/or other issues.

SUMMARY OF THE INVENTION

In accordance with an aspect of the present invention, a method for providing a program guide is disclosed. According to an exemplary embodiment, the method comprises steps of displaying the program guide comprising a plurality of program titles, determining a program title pointed to by a pointer, determining a channel associated with the determined program title, and displaying signal strength of the determined channel along with the program guide.

In accordance with another aspect of the present invention, a method for providing a program guide is disclosed. According to an exemplary embodiment, the method comprises steps of displaying the program guide comprising a plurality of program titles wherein each of the program titles is associated with a channel, measuring signal strength of at least one channel associated with the program titles, and displaying the signal strength along with the program guide.

In accordance with still another aspect of the present invention, an apparatus for providing a program guide is disclosed. According to an exemplary embodiment, the apparatus comprises first means such as a memory for storing data related to the program guide, and second means such as a processor for enabling display of the program guide using the stored data. The program guide comprises a plurality of program titles. The second means determines a program title pointed to by a pointer and determines a channel associated with the determined program title. Signal strength of the determined channel is displayed along with the program guide.

In accordance with yet another aspect of the present invention, an apparatus for providing a program guide is disclosed. According to an exemplary embodiment, the apparatus comprises first means such as a memory for storing data related to said program guide, and second means such as a processor for enabling display of the program guide using the stored data. The program guide comprises a plurality of program titles and each program title is associated with a channel. The second means measures signal strength of at least one channel associated with the program titles, and the signal strength is displayed along with the program guide.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
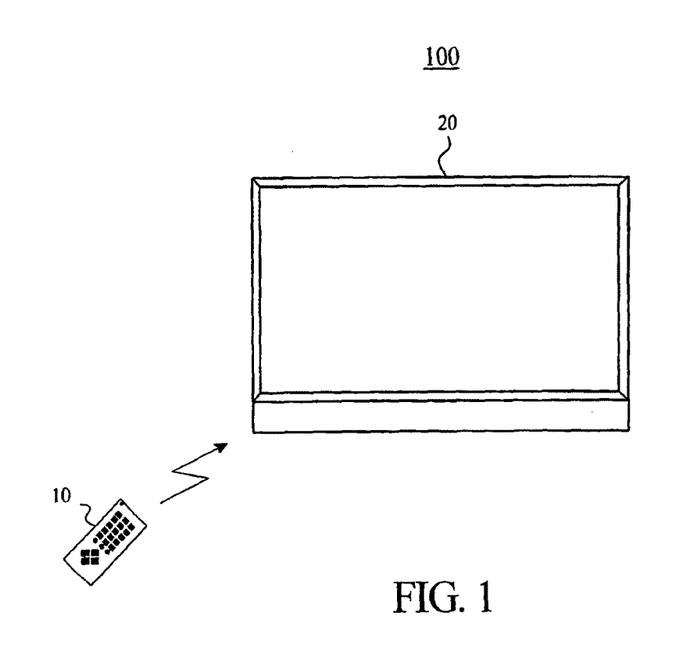
FIG. 1 is an exemplary environment suitable for implementing the present invention.

Referring now to the drawings, and more particularly to FIG. 1, an exemplary environment 100 suitable for implementing the present invention is shown. As indicated in FIG. 1, environment 100 comprises user input means such as user input device 10, and electronic apparatus such as apparatus 20. According to an exemplary embodiment, apparatus 20 is embodied as a television signal receiver, but may be embodied as any type of device or apparatus capable of providing an on-screen program guide.

User input device 10 is operative to generate and output control signals that control the operation of apparatus 20 and/or other devices. According to an exemplary embodiment, user input device 10 includes a plurality of input keys and outputs control signals in a wired and/or wireless (e.g., via infrared (IR) or radio frequency (RF) link, etc.) manner responsive to user depression of its input keys. User input device 10 may for example be embodied as a hand-held remote control device, wired and/or wireless keyboard, integrated control panel of apparatus 20, and/or other user input device.

Apparatus 20 is operative to receive signals including audio, video and/or data signals in analog and/or digital format from one or more signal sources such as terrestrial, cable, satellite, internet and/or other signal sources and to provide aural and/or visual outputs corresponding to these received signals. Apparatus 20 is also operative to process received signals and provide the resulting processed signals to one or more other devices, and to receive signals from other devices. According to an exemplary embodiment, apparatus 20 is capable of providing an on-screen program guide that includes information indicating channel signal strength. This feature advantageously provides users with information pertaining to the possibility of actually receiving a channel at the time of channel selection. Further details regarding the on-screen program guide feature of apparatus 20 will be provided later herein.

Figure 2:
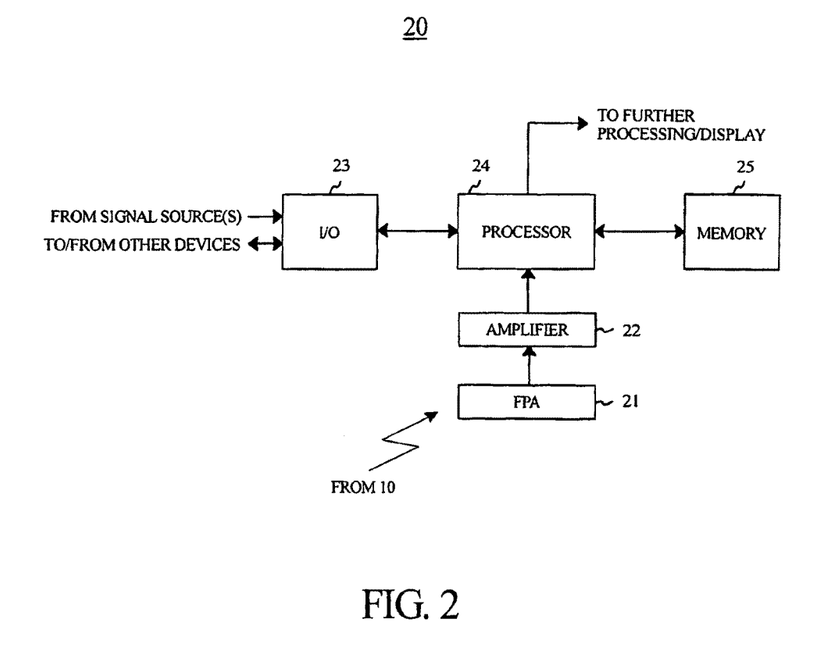
FIG. 2 is a diagram providing further details of the apparatus of FIG. 1 according to an exemplary embodiment of the present invention.

Referring to FIG. 2, a block diagram providing further details of apparatus 20 of FIG. 1 according to an exemplary embodiment of the present invention is shown. Apparatus 20 of FIG. 2 comprises front panel means such as front panel assembly (FPA) 21, coupling means such as amplifier 22, and input/output (I/O) means such as I/O block 23, processing means such as processor 24, and memory means such as memory 25. Some of the foregoing elements of FIG. 2 may be embodied using integrated circuits (ICs), and some elements may for example be included on one or more ICs. For clarity of description, certain conventional elements associated with apparatus 20 such as certain control signals, power signals and/or other elements may not be shown in FIG. 2.

FPA 21 is operative to receive user inputs from user input device 10, and to output signals corresponding to the user inputs to amplifier 22. According to an exemplary embodiment, FPA 21 receives signals, such as IR and/or RF signals, from user input device 10 and generates corresponding signals which are output to amplifier 22. Amplifier 22 is operative to amplify the signals provided from FPA 21 for output to processor 24.

I/O block 23 is operative to perform I/O functions of apparatus 20. According to an exemplary embodiment, I/O block 23 is operative to receive signals such as audio, video and/or data signals in analog and/or digital format from one or more signal sources such as terrestrial, cable, satellite, internet and/or other signal sources. I/O block 23 is also operative to output processed signals to one or more other devices, and to receive signals from such devices.

Processor 24 is operative to perform various signal processing and control functions of apparatus 20. According to an exemplary embodiment, processor 24 processes the audio, video and/or data signals provided from I/O block 23 by performing functions including tuning, demodulation, forward error correction, and transport processing functions to thereby generate digital data representing audio, video and/or data content. The digital data produced from such processing functions may be provided for further processing and/or output.

Processor 24 is also operative to execute software code that enables display of an on-screen program guide according to principles of the present invention. According to an exemplary embodiment, processor 24 is operative to enable display of a program guide using data stored in memory 25. The program guide comprises a plurality of program titles with each program title being associated with a channel. The program guide also includes one or more indicators that represent the signal strength of one or more channels associated with program titles that are currently displayed in the program guide. Processor 24 is programmed is periodically measure the signal strength of these one or more channels. In this manner, processor 24 can periodically update the program guide display to reflect the current signal strength of one or more channels.

Also according to an exemplary embodiment, processor 24 is programmed to determine the identity of a program title pointed to by a user and the corresponding channel that provides the program title. Processor 24 then measures the signal strength of this corresponding channel and displays the measured signal strength along with the program guide. In this manner, a user may for example quickly determine the signal strength of a channel by pointing to (e.g., highlighting via cursor, etc.) a particular program title within the program guide. Further details regarding processor 24 and the aforementioned program guide feature will be provided later herein. Processor 24 is also operative to perform and/or enable other functions of apparatus 20 including, but not limited to, processing user inputs made via user input device 10, reading and writing data from and to memory 25, and/or other operations.

Memory 25 is operatively coupled to processor 24 and performs data storage functions of apparatus 20. According to an exemplary embodiment, memory 25 stores data including, but not limited to, software code, on-screen display (e.g., program guide, etc.) data, user setup data, and/or other data.

Figure 3:
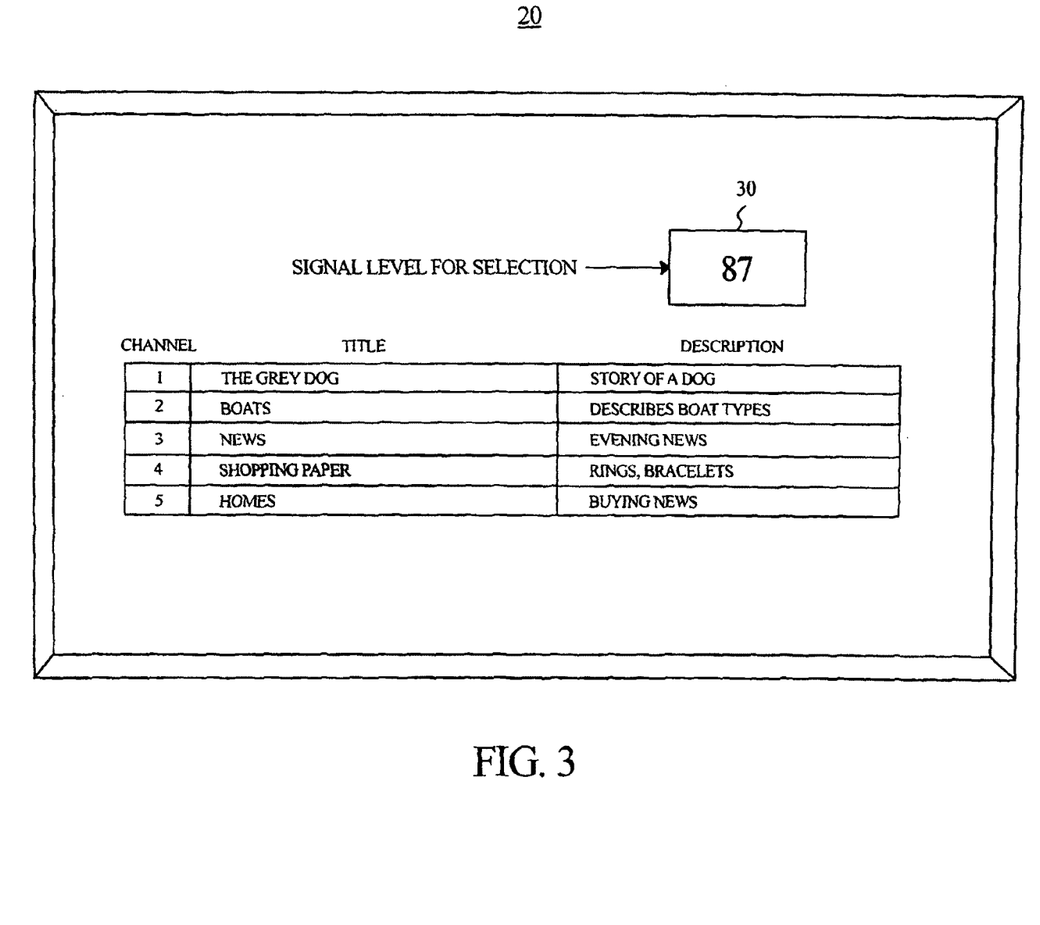
FIG. 3 is a diagram of an on-screen program guide according to an exemplary embodiment of the present invention.
Figure 4:
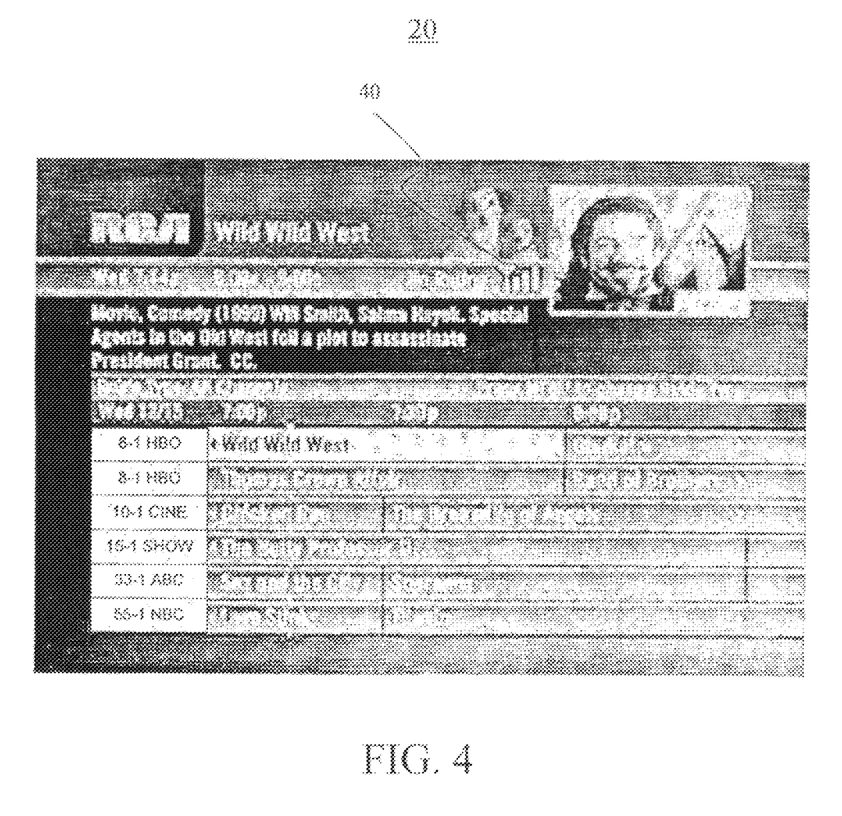
FIG. 4 is a diagram of an on-screen program guide according to another exemplary embodiment of the present invention.
Figure 5:
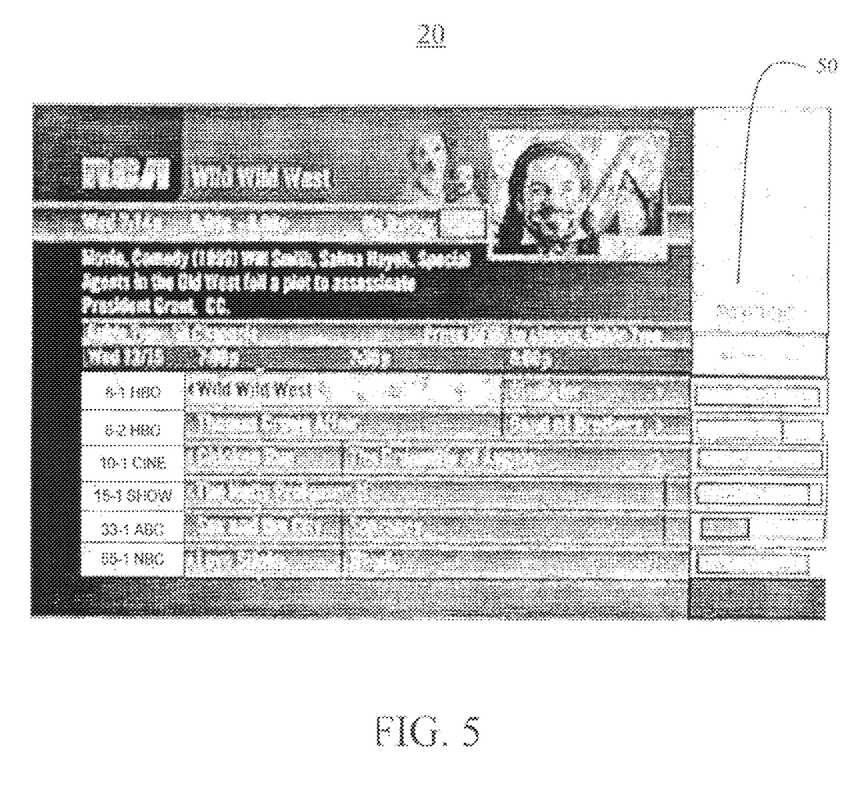
FIG. 5 is a diagram of an on-screen program guide according to still another exemplary embodiment of the present invention.

Referring now to FIGS. 3 to 5, diagrams of on-screen program guides according to exemplary embodiments of the present invention are shown. As shown in FIGS. 3 to 5, each program guide includes a plurality of program titles and each program title is associated with a channel. Also, each program guide includes a plurality of grids where each grid includes one of the program titles. The program titles themselves may represent audio visual programming, as on a television set, or audio programming available on a radio with a visual channel selector. The program guide itself may or may not be interactive. In accordance with principles of the present invention, each program guide shown in FIGS. 3 to 5 includes one or more indicators that indicate the signal strength of one or more channels. These indicators are represented by reference numerals 30, 40 and 50 in FIGS. 3, 4 and 5, respectively.

The inclusion of one or more signal strength indicators, such as indicators 30 to 50 in FIGS. 3 to 5, in a program guide allows a user ready to make a channel selection to predetermine the capability of tuning to that channel. For example, a low signal strength reading from an indicator may inform the user that an antenna adjustment or something else may be necessary to increase signal strength, or that a received signal may be too low or non-existent. Although not expressly shown in FIGS. 3 to 5, each signal strength indicator 30 to 50 may also have associated text (e.g., "adjust antenna", "station not available", etc.) that helps a user if low signal strength is detected. The actual design and appearance of the signal strength indicator(s) may be a matter of design choice. For example, the signal strength indicator may present information via a number (see indicator 30 in FIG. 3) and/or a graphic representation such as a series of bars (see indicators 40 and 50 in FIGS. 4 and 5).

According to at least one exemplary embodiment, the indicator(s) indicates the signal strength of a channel providing a program title that is currently pointed to by a pointer (e.g., highlighted by a cursor, etc.). FIGS. 3 and 4 show examples of this. In FIG. 3, for example, channel 4 is shown as having signal strength of 87. In all designs, the signal strength represented by the indicator(s) may be relative or actual. Regardless of design, it may be generally desirable from a user standpoint for the signal strength indicator(s) to be in relatively close proximity to the corresponding channel information within the program guide.

Multiple indicators for multiple channels may also be employed (see indicators 50 in FIG. 5). When multiple signal strength indicators for multiple channels are employed, the channels may be arranged in the program guide according to signal strength. For example, the channels may be arranged in the program guide in ascending order according to signal strength. Color may also be used to indicate signal strength. For example, red may be used to indicate poor signal strength, yellow may be used to indicate questionable signal strength and green may be used to indicate good signal strength. In all designs, it is generally desirable for indicators to be periodically updated to reflect the current channel signal strength.

Figure 6:
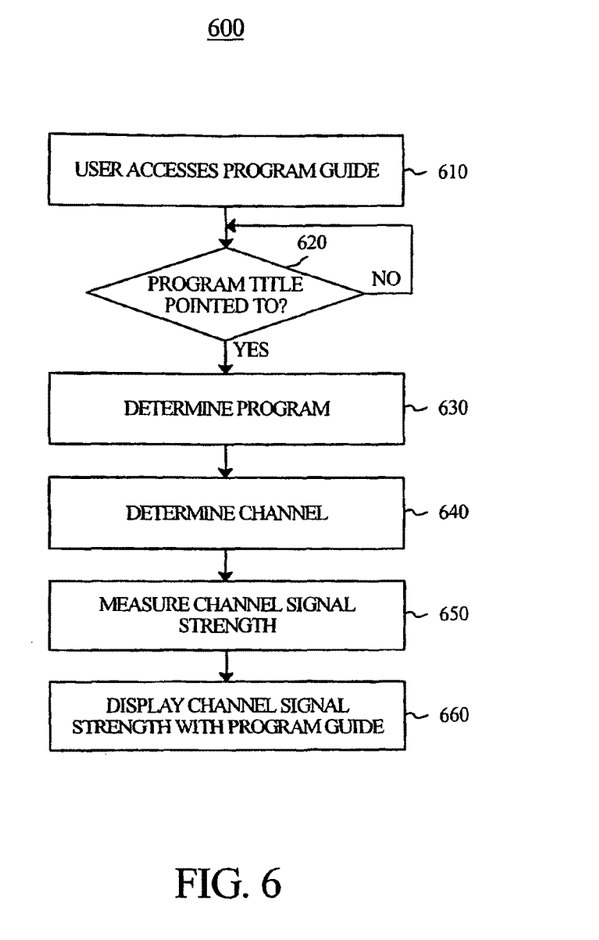
FIG. 6 is a flowchart illustrating steps for providing an on-screen program guide according to an exemplary embodiment of the present invention.

Referring now to FIG. 6, a flowchart 600 illustrating steps for providing an on-screen program guide according to an exemplary embodiment of the present invention is shown. For purposes of example and explanation, the steps of FIG. 6 will be described with reference to apparatus 20 of FIGS. 1 and 2, and the exemplary program guides of FIGS. 3 to 5. The steps of FIG. 6 are exemplary only, and are not intended to limit the present invention in any manner.

At step 610, a user accesses a program guide. According to an exemplary embodiment, a user may access the program guide at step 610 by providing one or more predetermined inputs to apparatus 20 via user input device 10 which are detected by processor 24. For example, the user may press a "GUIDE" or "MENU" key of user input device 10 at step 610 to access the program guide. Processor 24 is programmed to enable display of the program guide at step 610 responsive to these one or more predetermined inputs using data stored in memory 25. Also according to an exemplary embodiment, the program guide accessed at step 610 includes a plurality of program titles and each program title is associated with a channel. The program guide may include a plurality of grids arranged according to a first dimension representing time and a second dimension representing channel information where each grid includes one of the program titles. FIGS. 3 to 5 show examples of program guides that may be accessed at step 610.

At step 620, apparatus 20 determines whether any program title within the program guide is pointed to. According to an exemplary embodiment, processor 24 detects if any particular program title within the program guide is pointed to at step 620. As referred to herein, a program title may be "pointed to" if it is highlighted by a cursor (e.g., via inputs to user input device 10), or otherwise highlighted or selected by a user (e.g., via touch screen inputs, etc.). As indicated in FIG. 6, step 620 is repeatedly performed until apparatus 20 determines that a program title within the program guide is pointed to.

After apparatus 20 determines that a program title within the program guide is pointed to at step 620, process flow advances to step 630 where apparatus 20 determines what particular program title is actually being pointed to. According to an exemplary embodiment, processor 24 is programmed to make the determination at step 630 by reading and processing program guide data stored in memory 25.

From step 630, process flow advances to step 640 where apparatus 20 determines a channel associated with the program title being pointed to. According to an exemplary embodiment, processor 24 is programmed to make the determination at step 640 by reading and processing program guide data stored in memory 25.

From step 640, process flow advances to step 650 where apparatus 20 measures the signal strength of the channel identified at step 640. According to an exemplary embodiment, processor 24 is programmed to measure the signal strength of the channel at step 650. The channel signal strength may be measured at step 640 in accordance with any signal strength measurement technique known in the art. Signal strength may also be measured at step 650 on a periodic basis to thereby determine the current signal strength of a channel. According to an exemplary embodiment, processor 24 measures the signal strength (a.k.a., signal quality) of a digital channel at step 650 by using its-demodulator to determine how many bits are in error. The number of bits that are in error may be used to determine the channel signal strength or quality. According to this exemplary embodiment, a channel may have a relatively weak signal (e.g., low amplitude), but if all of the bits are correct, the channel may be determined to have good signal strength or quality. Conversely, a channel may have a relatively strong signal (e.g., high amplitude), but factors such as reflections or noise from electronic components may cause a relatively high number of bit errors. In this case, the channel may be determined to have poor signal strength or quality. Accordingly, as referred to herein, the terms "signal strength" and "signal quality" may be used interchangeably. The number of detected bit errors that deem a channel as having strong or weak signal strength or quality may be set as a matter of design choice. However, when the number of bit errors exceeds a certain point, a useable signal will not be present.

From step 650, process flow advances to step 660 where apparatus 20 causes the channel signal strength measured at step 650 to be displayed along with the program guide. According to an exemplary embodiment, processor 24 enables the channel signal strength measured at step 650 to be displayed along with the program guide at step 660.

Of course, variations of the steps of FIG. 6 are also within the scope of the present invention. For example, if a program guide such as the program guide shown in FIG. 5 is employed, processor 24 may be programmed to measure the signal strength of all channels associated with program titles that are currently displayed in the program guide, and enable display of indicators 50 for these channels. With this embodiment, signal strength indicators 50 may be provided along with the program guide independently of whether any particular program title within the program guide is pointed to. Other variations of the concepts disclosed herein may also be within the scope of the present invention.

As described herein, the present invention provides an apparatus and method for providing a program guide that includes information indicating channel signal strength. The present invention may be applicable to various apparatuses, either with or without an integrated display device. Accordingly, the term "apparatus" as used herein may refer to systems or apparatuses including, but not limited to, television sets, radios, computers, monitors or telephones that include an integrated display device, and systems or apparatuses such as set-top boxes, video cassette recorders (VCRs), digital versatile disk (DVD) players, video game boxes, personal video recorders (PVRs), computers or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for providing a program guide, comprising steps of:
    displaying said program guide comprising a plurality of program titles, each said program title being associated with a channel;
    measuring signal quality of each said channel associated with said program titles that are currently displayed;
    detecting one of said program titles being highlighted;
    measuring said signal quality of said channel associated with said highlighted program title in response to said detection; and
    displaying said measured signal quality for each of said channels simultaneously along with said program guide, wherein each of said plurality of channels displayed in said program guide includes a graphical, non-numeric signal quality indicator displayed against a single signal level meter including a plurality of index marks that enable a user to compare said measured signal qualities of all of said plurality of channels simultaneously by comparing each of said graphical, non-numeric signal quality indicators against said index marks.

2. A method for providing a program guide, comprising steps of:
    measuring signal quality of each of a plurality of channels associated with a plurality of program titles that are currently displayed in said program guide;
    detecting one of said program titles being highlighted;
    measuring said signal quality of said channel associated with said highlighted program title in response to said detection;
    displaying indications of said measured signal quality for each of said plurality of channels simultaneously along with said program guide, wherein each of said plurality of channels displayed in said program guide includes a graphical, non-numeric signal quality indicator displayed against a single signal level meter including a plurality of index marks that enable a user to compare said measured signal qualities of all of said plurality of channels simultaneously by comparing each of said graphical, non-numeric signal quality indicators against said index marks; and
    wherein, if said measured signal quality for any one of said plurality of channels displayed in said program guide is below a threshold, said indication of said measured signal quality for said channel includes one of: a message indicating a corrective action that may be taken, and a message indicating that said channel is not available.

3. The method of claim 2, wherein said index marks include numerical markers placed along a number line that represents said single signal level meter.

4. The method of claim 2, wherein each said graphical, non-numeric signal quality indicator includes a bar.

5. The method of claim 4, wherein said bars and said signal level meter are displayed in a dedicated column of said program guide adjacent to a listing of said plurality of program titles.

6. The method of claim 2, wherein said measuring step is performed periodically for each of said plurality of channels.

7. The method of claim 2, wherein different colors are used in said program guide to represent different measured signal qualities.

8. The method of claim 2, wherein said channels are arranged in said program guide in an ascending order according to said measured signal qualities.

9. The method of claim 2, wherein said program guide includes a plurality of grids arranged according to a first dimension representing time and a second dimension representing channel information, and each said grid includes one of said program titles.

10. The method of claim 9, wherein said measured signal quality of each of said channels is displayed in said program guide in proximity to said program title associated with said each of said channels.

11. An apparatus for providing a program guide, comprising:
    first means for storing data related to said program guide;
    second means for enabling display of said program guide using said stored data, said program guide comprising a plurality of program titles, each said program title being associated with a channel;
    said second means detecting one of said program titles being highlighted and measuring signal quality of said channel associated with said highlighted program title in response to said detection; and
    said second means enabling display of said measured signal quality for each of said channels simultaneously along with said program guide, wherein each of said channels displayed in said program guide includes a graphical, non-numeric signal quality indicator displayed against a single signal level meter including a plurality of index marks that enable a user to compare said measured signal qualities of all of said plurality of channels simultaneously by comparing each of said graphical, non-numeric signal quality indicators against said index marks.

12. An apparatus for providing a program guide, comprising:
    first means for storing data related to said program guide;
    second means for measuring signal quality of each of a plurality of channels associated with a plurality of program titles that are currently displayed in said program guide;
    said second means detecting one of said program titles being highlighted and measuring said signal quality of said channel associated with said highlighted program title in response to said detection;
    said second means enabling indications of said measured signal qualities for all of said plurality of channels to be displayed simultaneously along with said program guide, wherein each of said plurality of channels displayed in said program guide includes a graphical, non-numeric signal quality indicator displayed against a single signal level meter including a plurality of index marks that enable a user to compare said measured signal qualities of all of said plurality of channels simultaneously by comparing each of said graphical, non-numeric signal quality indicators against said index marks; and wherein, if said measured signal quality for any one of said plurality of channels displayed in said program guide is below a threshold, said indication of said measured signal quality for said channel includes one of: a message indicating a corrective action that may be taken, and a message indicating that said channel is not available.

13. The apparatus of claim 12, wherein said index marks include numerical markers placed along a number line that represents said single signal level meter.

14. The apparatus of claim 12, wherein each said graphical, non-numeric signal quality indicator includes a bar.

15. The apparatus of claim 14, wherein said bars and said signal level meter are displayed in a dedicated column of said program guide adjacent to a listing of said plurality of program titles.

16. The apparatus of claim 12, wherein said second means periodically measures said signal quality of each of said plurality of channels.

17. The apparatus of claim 12, wherein different colors are used in said program guide to represent different measured signal qualities.

18. The apparatus of claim 12, wherein said channels are arranged in said program guide in an ascending order according to said measured signal qualities.

19. The apparatus of claim 12, wherein said program guide includes a plurality of grids arranged according to a first dimension representing time and a second dimension representing channel information, and each said grid includes one of said program titles.

20. The apparatus of claim 19, wherein said measured signal quality of each of said channels is displayed in said program guide in proximity to said program title associated with said each of said channels.

21. An apparatus for providing a program guide, comprising:
 a memory operative to store data related to said program guide;
 a processor operatively coupled to said memory, said processor being operative to enable display of said program guide using said stored data, said program guide comprising a plurality of program titles, each said program title being associated with a channel;
 said processor detecting one of said program titles being highlighted and measuring signal quality of said channel associated with said highlighted program title in response to said detection; and
 said processor enabling display of said measured signal quality for each of said channels simultaneously along with said program guide, wherein each of said plurality of channels displayed in said program guide includes a graphical, non-numeric signal quality indicator displayed against a single signal level meter including a plurality of index marks that enable a user to compare said measured signal qualities of all of said plurality of channels simultaneously by comparing each of said graphical, non-numeric signal quality indicators against said index marks.

22. An apparatus for providing a program guide, comprising:
 a memory operative to store data related to said program guide;
 a processor operatively coupled to said memory, said processor being operative to measure signal quality of each of a plurality of channels associated with a plurality of program titles that are currently displayed in said program guide;
 said processor detecting one of said program titles being highlighted and measuring said signal quality of said channel associated with said highlighted program title in response to said detection;
 said processor enabling indications of said measured signal qualities for all of said plurality of channels to be displayed simultaneously along with said program guide, wherein each of said plurality of channels displayed in said program guide includes a graphical, non-numeric signal quality indicator displayed against a single signal level meter including a plurality of index marks that enable a user to compare said measured signal qualities of all of said plurality of channels simultaneously by comparing each of said graphical, non-numeric signal quality indicators against said index marks; and
 wherein, if said measured signal quality for any one of said plurality of channels displayed in said program guide is below a threshold, said indication of said measured signal quality for said channel includes one of: a message indicating a corrective action that may be taken, and a message indicating that said channel is not available.

23. The apparatus of claim 22, wherein said index marks include numerical markers placed along a number line that represents said single signal level meter.

24. The apparatus of claim 22, wherein each said graphical, non-numeric signal quality indicator includes a bar.

25. The apparatus of claim 24, wherein said bars and said signal level meter are displayed in a dedicated column of said program guide adjacent to a listing of said plurality of program titles.

26. The apparatus of claim 22, wherein said processor periodically measures said signal quality of each of said plurality of channels.

27. The apparatus of claim 22, wherein different colors are used in said program guide to represent different measured signal qualities.

28. The apparatus of claim 22, wherein said channels are arranged in said program guide in an ascending order according to said measured signal qualities.

29. The apparatus of claim 22, wherein said program guide includes a plurality of grids arranged according to a first dimension representing time and a second dimension representing channel information, and each said grid includes one of said program titles.

30. The apparatus of claim 29, wherein said measured signal quality of each of said channels is displayed in said program guide in proximity to said program title associated with said each of said channels.

* * * * *